D. YOKLEY.
STALK CUTTER ATTACHMENT.
APPLICATION FILED SEPT. 17, 1912.
1,147,588.
Patented July 20, 1915.
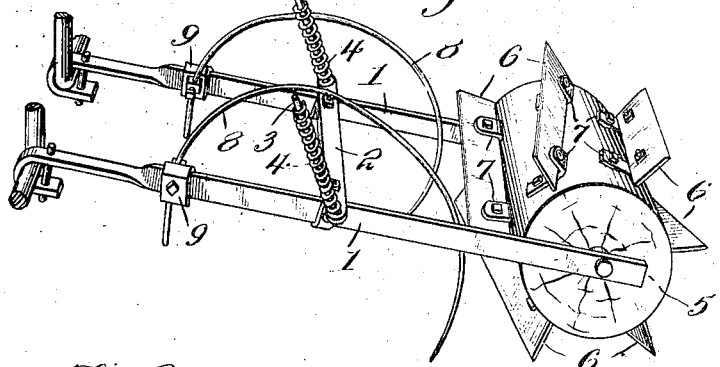
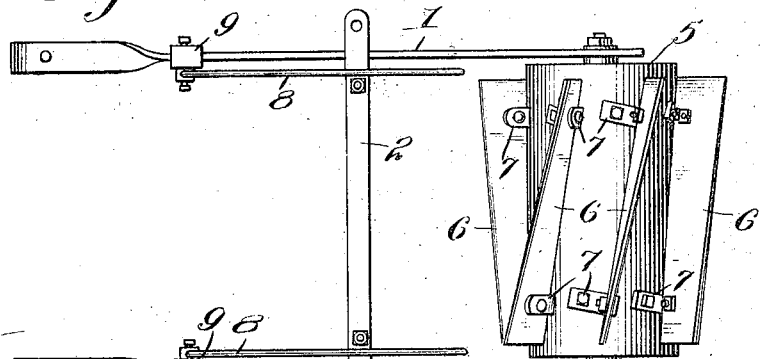
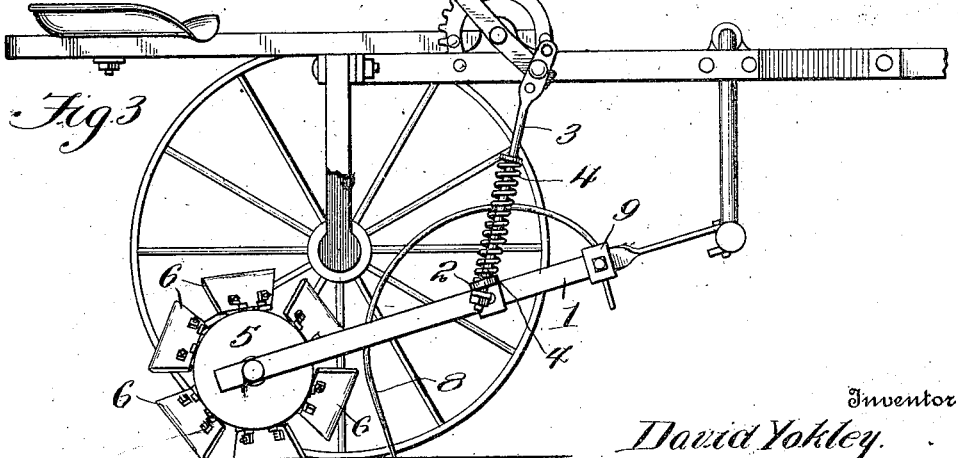
Inventor
David Yokley.
Witnesses
J. T. L. Wright
U. B. Hillyard.
By Victor J. Evans.
Attorney

UNITED STATES PATENT OFFICE.

DAVID YOKLEY, OF THOMASVILLE, NORTH CAROLINA.

STALK-CUTTER ATTACHMENT.

1,147,588.  Specification of Letters Patent.  Patented July 20, 1915.

Application filed September 17, 1912. Serial No. 720,868.

*To all whom it may concern:*

Be it known that I, DAVID YOKLEY, a citizen of the United States, residing at Thomasville, in the county of Davidson and State of North Carolina, have invented new and useful Improvements in Stalk-Cutter Attachments, of which the following is a specification.

The invention provides an attachment particularly designed to be applied to a two horse cultivator and intended for cutting stalks, vines and the like when preparing the ground for cultivation.

The invention consists of an attachment embodying draft bars, a drum mounted upon the draft bars, blades secured to the drum having a diagonal or inclined arrangement a connecting means whereby the drum is pressed toward the ground and guards for directing stalks, vines and the like beneath the drum so as to be acted upon by the cutting blades.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a detail view of a stalk cutting attachment embodying the invention. Fig. 2 is a top plan view thereof. Fig. 3 is a detail view, showing the connecting means.

Corresponding and like parts are referred to in the following description, and indicated in all the views of the drawing, by the same reference characters.

The attachment comprises draft bars 1 which are provided at their forward ends with attaching means for coupling the cutter to a cultivator or other implement. A cross bar 2 connects the draft bars 1 and is vertically pierced near its ends to receive rods 3 which are attached to the framework of the cultivator and which receive springs 4 which exert a pressure to hold the cutter to its work. A drum 5 is mounted upon the rear ends of the draft bars 1 and has blades 6 which project outwardly approximately at a right angle to the surface of the drum and which incline or have an approximate diagonal arrangement. Brackets 7 secured to the drum 5 form supporting means for the blades 6 and admit of the blades being properly adjusted or removed for sharpening or to be replaced in the event of any one becoming unfitted for effective service. Guards 8 are provided for directing stalks, vines and the like beneath the drum so as to insure their being cut. The guards consist of bars preferably of spring metal, such as steel, the same being attached to the draft bars and extending downwardly and rearwardly. Clamps 9 have the upper ends of the guards 8 attached thereto and serve to adjustably connect the guards to the draft bars.

In the operation of the device the draft bars 1 are coupled to the axle or other convenient part of the cultivator by means of the attaching devices at their front ends. As the cultivator is drawn over the field the stalks, vines and the like are topped or cut into small pieces by means of the blades 6. The inclined or diagonal arrangement of the blades has been found to give the best results and insures positive cutting of the stalks and a clearing of the same from the cutter.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A stalk cutter comprising bars, clamp blocks slidably mounted thereon, means for securing the blocks at adjusted positions on the bars, curved resilient guards having approximately parallel end portions disposed transversely of the bars said guards having one end portion adjustably secured to the blocks and a rotary cutter journaled between the bars.

In testimony whereof I affix my signature in presence of two witnesses.

DAVID YOKLEY.

Witnesses:
H. H. HEDRICK,
H. B. HUTCHISON.